United States Patent [19]

Plaisted et al.

[11] Patent Number: 5,165,958

[45] Date of Patent: Nov. 24, 1992

[54] METHOD FOR THE SEALING OF MINE STOPPINGS

[75] Inventors: Anthony C. Plaisted, Lexington; Leonard G. Hickam, Georgetown, both of Ky.

[73] Assignee: Fosroc International Limited, Birmingham, England

[21] Appl. No.: 804,143

[22] Filed: Dec. 6, 1991

Related U.S. Application Data

[63] Continuation-in-part of Ser. No. 561,761, Aug. 27, 1990, abandoned, which is a continuation-in-part of Ser. No. 420,495, Oct. 12, 1989, abandoned.

[51] Int. Cl.$^5$ .................................................. B05C 1/16
[52] U.S. Cl. ................................... 427/136; 427/377; 427/397.8; 427/421; 405/264; 106/38.23
[58] Field of Search ............... 427/136, 377, 376.2, 427/397.8, 421; 405/264; 106/38.23

[56] References Cited

U.S. PATENT DOCUMENTS

| | | | |
|---|---|---|---|
| 3,920,460 | 11/1975 | Boston et al. | 106/38.35 |
| 4,072,019 | 2/1978 | Pearson | 106/900 |
| 4,185,141 | 1/1980 | Krejci et al. | 427/427 |
| 4,240,838 | 12/1980 | Blasko et al. | 427/397.8 |
| 4,261,670 | 4/1981 | Paban | 427/136 |
| 4,325,658 | 4/1982 | Baker | 405/264 |
| 4,347,285 | 8/1982 | Batdorf | 427/397.8 |
| 4,380,595 | 4/1983 | Arpin | 427/221 |
| 4,607,066 | 8/1986 | Barry et al. | 405/264 |
| 4,687,790 | 8/1987 | Andreichuk | 405/264 |
| 4,799,549 | 1/1989 | Vinot et al. | 106/900 |

*Primary Examiner*—Michael Lusignan
*Assistant Examiner*—Diana L. Dudash
*Attorney, Agent, or Firm*—Caesar, Rivise Bernstein, Cohen & Pokotilow, Ltd.

[57] ABSTRACT

A method utilizing non-reaction fillers in the sealing of mine stoppings, such as concrete block under wet or humid conditions, the method comprising providing (a) from about 10 to about 85% by weight of a water soluble alkali metal silicate, (b) about 0.7% to about 10.0% by weight of a water soluble or water miscible reactant for said alkali metal silicate and (c) about 2 to about 50% of non-reactive fillers, bringing components (a), (b) and (c) together with sufficient mixing to form a sealing composition, applying the composition in a coating to the stoppings and permitting the composition to set while being exposed to wet or humid conditions to form an impervious sealant coating thereby preventing penetration of air and dust through the stoppings.

12 Claims, No Drawings

METHOD FOR THE SEALING OF MINE STOPPINGS

BACKGROUND OF THE INVENTION

This application is a continuation-in-part based on Application Ser. No. 07/561,761, now abandoned, filed Aug. 27, 1990 which was a continuation-in-part based on Application Ser. No. 07/420,495 filed Oct. 12, 1989, now abandoned.

This invention relates to a method utilizing non-reactive fillers in the sealing of mine stoppings, such as concrete block. While sealants are known for such general purpose, it is believed that none of such sealants will set or harden under wet conditions to achieve satisfactory sealing.

PRIOR USAGES

It is known to use stoppings, such as concrete blocks, to control and direct flow of air through underground mine areas and to seal off sections or particular areas in the mine to enable the maintenance of a proper atmosphere affording the least hostile conditions under the circumstances to miners or workers in such sections or areas.

These stoppings, such as concrete blocks are usually made airtight by applying a non-porous coating or layer to the surfaces and to the various areas of abutment. The usual technique involves the trowelling over the surface and abutment areas with cementitious mortars based on Portland cement/sand powder blends mixed with water.

Such cementitious mortars are generally satisfactory to reduce or prevent unwanted airflow. Thus, the stoppings as covered with the cementitious mortar considerably reduce the quantity of undesirable air flowing into a sealed off surface. Stoppings are walls or partitions used in underground room and pillar mines. They are strategically constructed to direct fresh air into areas of the mine required by law to be properly ventilated.

Conventional stoppings are constructed, for example, from hollow concrete block either dry stacked or wet laid, i.e., cemented in place. Without adequate sealing, such conventional stoppings leak large amounts of air through the porous block and especially around perimeters, where sealing is difficult. Also, these stoppings may also be of metal or other materials as will occur to one siilled in the art.

Accordingly, the elimination of leakage from stoppings is essential for safe working. Also, the elimination of stopping leakage considerably cuts power costs for ventilation.

However, it has been determined that the use of mortars, including so-called ready-to-use mortars, is limited by the inability of these mortars to set in areas of high humidity or wet conditions where drying cannot take place.

BRIEF SUMMARY OF INVENTION

The present invention essentially involves a method of sealing mine stoppings under wet and dry conditions by using an aqueous curable sealant composition comprising:
(1) From about 10 to 85%, preferably from about 50 to 70% by weight of an aqueous solution of alkali metal silicate, such as sodium or potassium metal silicate as hereinafter defined.
(2) From about 2 to 50%, preferably about 35 to 40% of at least one non-reactive filler which is so non-reactive that it (they) will not have setting properties in conjunction with the water soluble alkali metal silicate.
(3) From about 0.7% to about 10.0%, preferably about 3.5% to 5% by weight of a water soluble or water miscible reactant.

It has been found that the foregoing aqeous curable sealant composition for use in a sealing method, which composition provides a ready-to-use mine sealant of extended shelf life of at least six months and as long as one year. Such sealant may be sprayed or troweled onto underground mine stoppings under wet conditions or high humidity or exposure to wet conditions. Such sealant also have successfully prevented air loss through typically porous block surfaces. A significant reduction in air loss is achieved when the porous blocks are coated on one or both surfaces, as well as in areas of abutment or around perimeters where sealing is difficult. Thus, with a reduced air loss, there is a corresponding improved efficiency of ventilation equipment. Also, the method of the present invention in the course of sealing, also achieves valuable fireproofing.

The sealants used in the method of the present invention may be provided in the form of ready-made mortars (or dry cementitious powders requiring the addition of water.) The resultant mortar will begin to harden and gain strength within eight hours under wet mine conditions. Air and moisture resistant properties will develop in about 24 hours.

The compositions used in the present invention are to be contrasted with the prior art ready-made mortar sealants which function by evaporation of water and therefore, need dry conditions before setting hard. With the present invention, the ready-made sealant is capable of setting in a predetermined time in either wet or dry conditions.

OBJECTS OF THE INVENTION

It is therefore an object of the present invention to provide a method utilizing non-reactive fillers in the sealing of mine stoppings involving the use of an economical sealant.

Yet another object of the present invention is to provide a sealant for use in a method utilizing non-reactive fillers in the sealing of mine stoppings that will set under wet conditions.

A further object of the present invention is to provide a sealant for use in a method utilizing non-reactive fillers in the sealing of mine stoppings which is provided as a ready-made formulation that can be readily applied and will set quickly.

Still another object of the present invention is to provide a sealant which is used in a method utilizing non-reactive fillers in the sealing of mine stoppings, which sealant has a long shelf life.

Yet another object of the present invention is to provide a sealant for use in a method which also achieves fireproofing of the stoppings and the preserved area.

DESCRIPTION OF THE PREFERRED EMBODIMENT

In the composition used in connection with the present invention, an aqueous solution of the alkali metal silicate is provided which may be sodium or potassium silicate and preferably has a $SiO_2$ to $M_2O$ mole ratio of from 2:1 to about 4:1 (where M represents the alkali metal) and the silicate solution has a solids content in the range of 10 to 60% by weight, preferably about 30 to 40% by weight (the remainder being water), and most preferably 36%. Also, potassium silicate as defined hereinabove may be used.

The fillers used in the sealant should be non-reactive and compatible with the silicate solution for long-term shelf life. Such fillers may comprise mica, cellulose fiber, glass fiber and other reinforcing non-reactive fibers, clay, kaolin pigments, dispersing agents.

The water soluble or water miscible reactant to initiate gel formation may be any weak acid or acid salt or ester or ester blend that hydrolyzes to release acid. Such esters may include diacetin, triacetin, and/or blends of commercially available dibasic esters known as D.B.E. comprising the methyl esters of adipic, glutaric and succinic or other materials characterized by the formula $R_1OOC(CH_2)_n COOR_2$ wherein $R_1$ and $R_2$ may be the same or different alkyl carbon atoms of from 1 to 20 preferably 1 to 6 and n is 2, 3 or 4, together with glycerol or propylene glycol to aid solubility of the ester.

As will be seen from the gel times in the detailed example set forth hereinbelow, the method of the present invention involves a composition with a gel time generally in the vicinity of at least 15 minutes and closer to 30 minutes. This is sufficient to enable hoses through which the composition is transported to be cleaned after the spraying operations and before the residual material remaining in the hoses tends to harden.

EXAMPLE I

|  | PARTS BY WEIGHT |
| --- | --- |
| PART 'A' | |
| Sodium Silicate Solution ($SiO_2/Na_2O$ = 3.22) | 66 (36% solids) |
| Water | 23 |
| Kaolin | 4 |
| Cellulose Fiber | 5 |
| Titanium Dioxide | 1 |
| Mica | 1 |
| PART 'B' | |
| Water | 37 |
| Tergitol XH (Nonionic surfactant) | 1 |
| Triacetin | 62 |

(a)Blending Part 'A' with Part 'B' at a volume ratio of 20:1 results in a gel time of 30 minutes at 70° F.
(b)Blending Part 'A' with Part 'B' at a volume ratio of 10:1 results in a gel time of 17 minutes at 70° F.

The kaolin in the above formula is a filler that adds consistency, trowelability and thixotropy (false body) to the final product.

Part A of the above-noted example also includes cellulose fiber which is another filler. There is also a minor amount of titanium dioxide that acts as a coloring agent so that the set coating on the stoppings has some reflectant properties.

The final component in Part A is mica which is a good film former and adds trowelability and thixotropy to the Part A mix.

In the Part B mix, the Tergitol XH is a true emulsifier for the triacetin or other reactant material so that it readily blends with the water.

Each of the Parts A and B are prepared separately by simply adding the various ingredients to a mixing vessel and mixing at room temperature. Sodium silicate is readily soluble in the water and then the other components of Part A are added in the order shown in the above example, with sufficient mixing.

To the same effect is Part B wherein the Tergitol XH is added to the water and then the triacetin is added, with the Tergitol XH acting as an emulsifier.

In use, the Part A and Part B components are brought together in a volume ratio of 20 Parts A to 1 Part B. On a weight basis, this is 26 parts by weight of Part A to 1 part of Part B. After adequate mixing in a tank, the slurry (which is reasonably pumpable), is forced through hoses and through a spray head onto the stopping or concrete block surfaces and abutment areas in order to provide a continuous coating. This coating sets in 30 minutes where the weight ratio of Part A to Part B is 26:1 and the temperature is 70° F.

In a second blend, the ratio of Part A to Part B on a volume basis is 10:1 or 13:1 parts by weight. The setting time for blend 2 is 17 minutes. There is also a blend 3 where the ratio of Part A to Part B is 17:1 on a volume basis and 22:1 on a weight basis. The set time is 23 minutes at 70° F. In the event the temperature is lowered, the set time will be longer.

The following field test case histories further illustrate the use of varying amounts of Part A and Part B.

The fillers used in the sealant should be non-reactive and compatible with the water soluble silicate for long term shelf-life.

EXAMPLE II—PREFERRED EMBODIMENT

In another embodiment of the invention Part 'A' and Part 'B' of the above Example I was formulated as follows:

|  | PARTS BY WEIGHT |
| --- | --- |
| PART 'A' | |
| Sodium Silicate Solution ($SiO_2/Na_2O$ = 3.22) | 56 (36% solids) |
| Water | 6 |
| Kaolin Clay | 37.5 |
| Alkali Resistant (AR) Glass Fiber | 0.5 |
| PART 'B' - PURE SOLUTION | |
| Triacetin | 90 |
| Propylene Glycol | 10 |

It is contemplated that Part B of Example II can be used with Part A of Example I and vice versa.
(a) Blending Part 'A' with Part 'B' at a volume ratio of 20:1 results in a gel time of 22 minutes at 70° F.
(b) Blending Part 'A' with Part 'B' at a volume ratio of 10:1 results in a gel time of 20 minutes at 70° F.

In the Part B of this example, there is no emulsifier; it being replaced by propylene glycol. Thus, there is a true solution. This is the preferred formulation. This formulation has long shelf life and stability, and added thixotropic properties in the mixed product.

FIELD TEST CASE HISTORIES

Test 1: Test site—Greenwich Collieries (#580 Portal) Penn. Relative Humidity 100%. Mine Temperature 65° F. (Water dripping from roof) Mine temperature—60° F. A total of 400 lbs. of Part A mine sealant were blended with 18 pounds of Part B. The resulting formulation was sprayed onto both sides of a wet hollow concrete block stopping, measuring 6 foot by 16 feet. The spray unit consisted of a progressing cavity pump feeding through 50 feet of discharge hose to a spray nozzle.

OBSERVATIONS—Within 50 minutes after spraying the material had set hard over the total surface of stopping which included a section on the backside subjected to running water.

TEST 2: Test Site : Beth Energy Underground Mine #81 Summersville, West Virginia. The mine conditions were 100% relative humidity and 64° F. A total of 400 lbs. of Part A mine sealant were blended with 18 pounds Part B. The resulting composition was sprayed onto concrete block stoppings of dimension 8 ft.×20 ft. and 5½ ft.×20 ft. respectively. Both these were old coated stoppings, badly cracked, having been subjected to roof and floor convergence, and leaking considerable amounts o air. Within on hour of spraying the treated stoppings were set hard and no leakage of air detectable.

TEST 3: Test Site : Southern Ohio Coal Company Miegs #1 Mine, Athens, Ohio. Mine Conditions—90% +Relative Humidity Temperature 62° F. 500 lbs. of formulation were sprayed at 17 to 31 volume ratio of Part A to Part B of the mine sealant system. Material applied to four stopping walls of size 6 ft.×18 ft., and one battery charging station approximately 6 ft.×12 ft. on both sides. Total elapsed time to spray all areas—35 minutes. After 45 minutes all stoppings were set dry.

TEST 4: A test conducted by the National Concrete Masonry Association indicated that a coating of ⅛ inch thick when applied to a dry stacked block stopping provides superior flexural strength compared to cement mortared concrete block. This meets the MINE SAFETY AND HEALTH ADMINISTRATON (MSHA) requirement for coatings applied as stopping compounds underground.

Without further elaboration, the foregoing will so fully illustrate our invention that others may, by applying future knowledge, adopt the same for use under various conditions of service.

We claim:

1. A method of sealing of mine stopping utilizing non-reactive fillers and optionally associated fibers, said method being useful in the sealing of mine stoppings, under wet or humid conditions, said method comprising providing an aqueous curable sealant composition having good shelf life, said composition having first and second components, said first component comprising on a total weight basis (a) from about 10 to 85% by weight an alkali metal silicate solution and (b) about 2 to about 50% of at least a one non-reactive filler, said, second component being essentially a solution on a total weight basis of from about 0.7% to about 10.0% of a water soluble or water miscible reactant for said alkaline metal silicate, bringing said two components together with sufficient mixing to form a sealing composition, applying said composition in a surface coating to said stoppings and permitting said compositions to set in a chemical reaction to initiate gel formation, said chemical reaction involving said alkali metal silicate and said water miscible reactant, while being exposed to wet or humid conditions to form an impervious sealant coating imparting structural strength and also preventing penetration of air and dust through said stoppings.

2. The method of claim 1 wherein said alkali metal silicate is sodium silicate.

3. The method of claim 2 wherein said sodium silicate has a $SiO_2$ to $M_2O$ mole ratio of from 2:1 to about 4:1 (wherein M represents the alkali metal) and said silicate solution has a solids content in the range of 10 to 60% by weight preferably 30 to 40% by weight.

4. The method of claim 2 wherein said reactant is triacetin.

5. The method of claim 1 wherein said reactant comprises commercially available dialkyl esters of the formula $R_1OOC(CH_2)_n COOR_2$ wherein $R_1$ and $R_2$ may be the same or different alkyl carbon atoms of 1 to 20, preferably 1 to 6 and n is 2, 3 or 4, said ester being selected from the group consisting of dimethyl succinate, dimethyl glutarate, dimethyl adipate, glycol esters and blends thereof:

6. The method of claim 4, including an emulsifier.

7. The method of claim 1 wherein said fillers are at least kaolin clay.

8. The method of claim 1 wherein said fibers are at least cellulose fiber.

9. The method of claim 1 wherein said fillers are at least titanium dioxide.

10. The method of claim 1 wherein said fillers are at least mica.

11. The method of claim 1 wherein said fibers are at least glass fiber.

12. The method of claim 5 wherein the glycol esters are selected from the group consisting of ethylene glycol diacetate, diacetin and triacetin.

* * * * *